(12) United States Patent
Cooley et al.

(10) Patent No.: US 9,052,904 B1
(45) Date of Patent: Jun. 9, 2015

(54) SYSTEM AND METHOD FOR DETERMINING WHETHER TO RESCHEDULE MALWARE SCANS BASED ON POWER-AVAILABILITY INFORMATION FOR A POWER GRID AND POWER-USAGE INFORMATION FOR THE SCANS

(75) Inventors: Shaun Cooley, El Segundo, CA (US); Keith Newstadt, Newton, MA (US)

(73) Assignee: Symantec Corporation, Mountain View, CA (US)

(*) Notice: Subject to any disclaimer, the term of this patent is extended or adjusted under 35 U.S.C. 154(b) by 1261 days.

(21) Appl. No.: 12/204,893

(22) Filed: Sep. 5, 2008

(51) Int. Cl.
*G06F 1/32* (2006.01)
*G06Q 50/06* (2012.01)
*G06Q 10/06* (2012.01)

(52) U.S. Cl.
CPC .......... *G06F 1/329* (2013.01); *G06Q 10/06312* (2013.01); *G06Q 50/06* (2013.01); *Y04S 20/222* (2013.01)

(58) Field of Classification Search
CPC ..... H02J 3/14; Y04S 20/222; Y02B 70/3225; G06Q 10/06312; G06Q 50/06; G06F 1/32; G06F 1/3203; G06F 1/3234; G06F 1/329; G06F 9/5094
USPC .......... 700/295; 705/7.22, 412; 713/300, 310, 713/320, 340; 718/102
See application file for complete search history.

(56) References Cited

U.S. PATENT DOCUMENTS

| 3,602,703 | A | * | 8/1971 | Polenz ........................ 700/291 |
|---|---|---|---|---|
| 5,414,640 | A | | 5/1995 | Seem |
| 5,528,507 | A | | 6/1996 | McNamara et al. |
| 6,289,399 | B1 | | 9/2001 | Furuichi et al. |
| 6,384,580 | B1 | | 5/2002 | Ochoa et al. |
| 6,747,368 | B2 | | 6/2004 | Jarrett, Jr. |
| 6,832,135 | B2 | | 12/2004 | Ying |
| 7,062,303 | B2 | * | 6/2006 | Guterman ..................... 455/574 |
| 7,062,304 | B2 | * | 6/2006 | Chauvel et al. ............... 455/574 |
| 7,360,106 | B2 | | 4/2008 | Kato et al. |
| 7,516,342 | B2 | | 4/2009 | Jahagirdar et al. |
| 8,001,403 | B2 | * | 8/2011 | Hamilton et al. ............. 713/320 |
| 2003/0229662 | A1 | * | 12/2003 | Luick ............................ 709/106 |
| 2005/0108075 | A1 | * | 5/2005 | Douglis et al. ..................... 705/8 |
| 2005/0154499 | A1 | | 7/2005 | Aldridge et al. |
| 2006/0149978 | A1 | | 7/2006 | Randall et al. |
| 2006/0288241 | A1 | | 12/2006 | Felter et al. |
| 2007/0010916 | A1 | * | 1/2007 | Rodgers et al. ............... 700/295 |
| 2007/0245163 | A1 | * | 10/2007 | Lu et al. ........................ 713/300 |
| 2007/0271006 | A1 | * | 11/2007 | Golden et al. ................ 700/295 |
| 2008/0143489 | A1 | | 6/2008 | Castaldo et al. |
| 2008/0189562 | A1 | | 8/2008 | McBrearty et al. |

(Continued)

OTHER PUBLICATIONS

WIPO, Bibliographic Data for PCT/GB2008/000915, Sep. 25, 2008, 1 page.*

(Continued)

*Primary Examiner* — David J Huisman
(74) *Attorney, Agent, or Firm* — ALG Intellectual Property, LLC (57) ABSTRACT

A computer-implemented method for determining whether to reschedule tasks on computing devices based on power-availability information for a power grid may comprise: 1) identifying at least one task scheduled to execute on a computing device, 2) receiving power-availability information for the power grid, and then 3) determining, based on the power-availability information, whether to reschedule the task. Corresponding systems and computer-readable media are also disclosed.

18 Claims, 6 Drawing Sheets

(56) References Cited

U.S. PATENT DOCUMENTS

| | | | |
|---|---|---|---|
| 2009/0063228 A1* | 3/2009 | Forbes, Jr. | 705/7 |
| 2009/0150696 A1* | 6/2009 | Song et al. | 713/323 |
| 2009/0249091 A1 | 10/2009 | Goodnow et al. | |
| 2009/0312899 A1* | 12/2009 | Mitchell et al. | 701/33 |
| 2009/0320031 A1* | 12/2009 | Song | 718/102 |
| 2009/0326728 A1* | 12/2009 | Chrisop et al. | 700/295 |
| 2010/0010857 A1* | 1/2010 | Fadell | 705/8 |
| 2010/0057529 A1* | 3/2010 | Boss et al. | 705/10 |
| 2010/0115048 A1* | 5/2010 | Scahill | 709/213 |

OTHER PUBLICATIONS

U.S. Appl. No. 12/208,610, filed Sep. 11, 2008, Cooley, Shaun.
U.S. Appl. No. 12/264,550, filed Nov. 4, 2008, Cooley, Shaun.
California ISO; California ISO: System Status; Jul. 18, 2004; pp. 1-2; http://www.caiso.com/outlook/outlook.html.
Gridpoint, Inc.; GridPoint: Reshaping the Load Duration Curve; Jul. 2, 2007; pp. 1-2; http://www.gridpoint.com/curve/overview/.

* cited by examiner

SYSTEM AND METHOD FOR DETERMINING WHETHER TO RESCHEDULE MALWARE SCANS BASED ON POWER-AVAILABILITY INFORMATION FOR A POWER GRID AND POWER-USAGE INFORMATION FOR THE SCANS

BACKGROUND

Computing devices often execute various tasks, such as automatic disk defragmentation and anti-virus scans, on regularly scheduled bases. Unfortunately, when a sufficient number of computing devices execute such tasks simultaneously, the collective activity of the computing devices may contribute to spikes on a power grid. For example, some researchers have estimated that regularly scheduled anti-virus scans performed by computing devices within a single time zone may increase the load on a power grid by as much as 93.75 Megawatts. Moreover, executing such tasks during peak hours may create unnecessary loads on a power grid's infrastructure, which may contribute to both high energy production and maintenance costs.

SUMMARY

As will be described in greater detail below, the instant disclosure generally relates to systems and methods for determining whether to reschedule tasks on computing devices based on power-availability information for a power grid. In one example, a system may comprise: 1) a power-availability module for publishing power-availability information for the power grid and 2) a task-scheduling module for receiving the power-availability information from the power-availability module, identifying at least one task scheduled to execute on a computing device, and then determining, based on the power-availability information, whether to reschedule the task.

The power-availability information may identify, or may contain information that may be used to calculate, an amount of power currently available on the power grid and/or an amount of power expected to be available on the power grid at a future time. The power-availability information may be in computer-readable and/or human-readable form.

In certain embodiments, the system may further comprise a power-estimation module for estimating both the expected duration of the task and the expected power usage of the computing device during the task. In certain embodiments, the task-scheduling module may consider the expected duration and the expected power usage of the task when determining whether to reschedule the task. In additional embodiments, the system may use the expected duration and expected power usage of tasks from a number of computing devices to forecast the amount of power expected to be available on the power grid at a future time.

The system may also comprise a task-permit module for issuing task permits to computing devices that allow specific tasks to run. The task-permit module may consider both the power-availability information for the power grid and other factors, such as the expected duration and the expected power usage of the task, before issuing the task permit. For example, the task-permit module may postpone issuing the task permit if the power-availability information indicates high demand or insufficient power on the power grid. In one embodiment, the system may also issue a discount on power costs to the computing device for executing the task in accordance with the task permit. Corresponding methods are also disclosed.

As will be explained below, the systems and methods disclosed herein may allow a power-management mechanism to induce computing devices to reschedule tasks based on power-availability information for a power grid. This process may reduce the number of power outages, both intentional (e.g., rolling blackouts) and unintentional, resulting from insufficient infrastructure or resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to systems and methods for determining whether to reschedule tasks on computing devices based on power-availability information for a power grid. The phrase "power grid," as used herein, generally refers to any power transmission system comprising at least one power source (e.g., power plants, electrical generators, solar panels, batteries, and battery arrays), at least one power consumer (e.g., computers and refrigerators), and at least one transmission line facilitating the flow of electricity from source to consumer.

Figure 1:
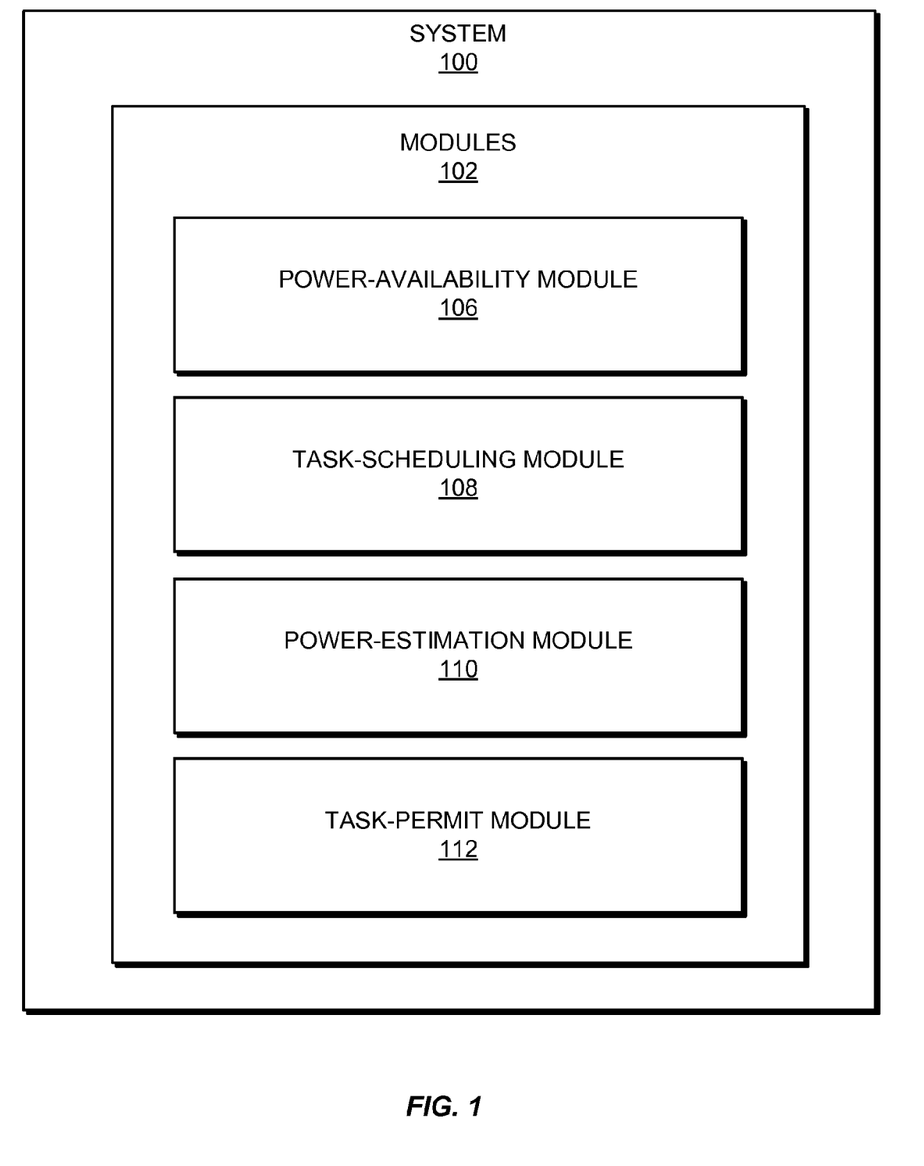
FIG. 1 is a block diagram of an exemplary system for determining whether to reschedule tasks on computing devices based on power-availability information for a power grid according to at least one embodiment.
Figure 2:
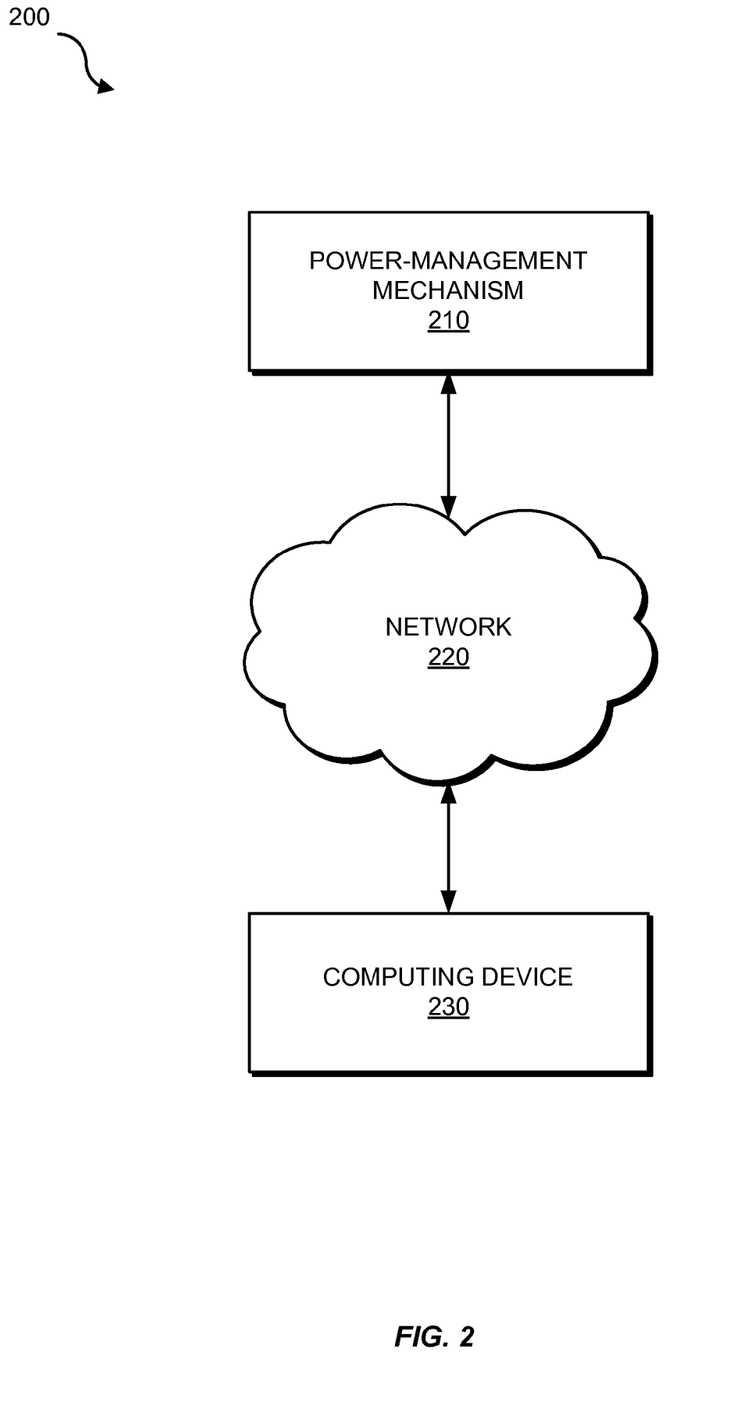
FIG. 2 is a block diagram of an exemplary system for determining whether to reschedule tasks on computing devices based on power-availability information for a power grid according to an additional embodiment.

The following will provide, with reference to FIGS. 1 and 2, detailed descriptions of exemplary systems for determining whether to reschedule tasks on computing devices based on power-availability information for a power grid. Descriptions of an exemplary computing system and an exemplary network architecture capable of implementing one or more of the embodiments described and/or illustrated herein will also be provided in connection with FIGS. 5 and 6. In addition, detailed descriptions of corresponding exemplary computer-implemented methods will be provided in connection with FIGS. 3 and 4.

FIG. 1 is a block diagram of an exemplary system 100 for determining whether to reschedule tasks on computing devices based on power-availability information for a power grid. As illustrated in this figure, exemplary system 100 may comprise one or more modules 102 for performing one or more tasks. For example, exemplary system 100 may comprise a power-availability module 106 for publishing and receiving power-availability information for a power grid and a task-scheduling module 108 for determining whether to reschedule tasks on computing devices based on power-availability information for a power grid.

As illustrated in FIG. 1, exemplary system 100 may also comprise a power-estimation module 110 for estimating the power requirements of tasks on computing devices. Further, exemplary system 100 may comprise a task-permit module 112 for issuing task permits that may allow computing devices to execute tasks based on power-availability information for a power grid. Although not illustrated in FIG. 1, exemplary system 100 may also comprise one or more additional modules for determining whether to reschedule tasks on computing devices based on power-availability information for a power grid.

In certain embodiments, one or more of modules 102 in FIG. 1 may represent one or more software applications or programs that, when executed by a computing device, may cause the computing device to perform one or more tasks required to determine whether to reschedule tasks on computing devices based on power-availability information for a power grid. For example, as will be described in greater detail below, one or more of modules 102 may represent software modules configured to run on one or more computing devices, such as the devices of system 200 in FIG. 2 (e.g., power-management mechanism 210 and computing device 230), computing system 510 in FIG. 5, and/or portions of exemplary network architecture 600 in FIG. 6. One or more modules 102 in FIG. 1 may also represent all or portions of one or more special-purpose computers configured to perform one or more tasks required to determine whether to reschedule tasks on computing devices based on power-availability information for a power grid.

FIG. 2 is a block diagram of an exemplary system 200 for determining whether to reschedule tasks on computing devices based on power-availability information for a power grid. As illustrated in FIG. 2, exemplary system 200 may comprise at least one power-management mechanism 210, at least one computing device 230, and at least one network 220. The term "power-management mechanism," as used herein, generally refers to any mechanism, device, or plurality of devices capable of accepting at least one network connection, collecting and publishing power-availability information, and servicing requests from additional devices. Examples of such power-management mechanisms include—without limitation—computers (e.g., laptops or desktops), servers, power utilities, embedded systems, or any other suitable computing device. As mentioned above, one or more of modules 102 may be stored and configured to run on power-management mechanism 210 to determine whether to reschedule tasks on computing devices based on power-availability information for a power grid.

Moreover, the phrase "computing device," as used herein, generally refers to any device capable of computing (i.e., comprising a CPU). Examples of computing devices include—without limitation—computers (e.g., laptops or desktops), cellular phones, personal digital assistants (PDAs), digital cameras, multimedia players, embedded systems, combinations of one or more of the same, or any other suitable computing device. To determine whether to reschedule tasks on computing device 230, one or more of modules 102 may be stored and configured to run thereon. Furthermore, one or more of modules 102 may be shared between power-management mechanism 210 and computing device 230, meaning that the same module may be configured to operate simultaneously on separate devices for a single purpose.

In addition, the term "network," as used herein, generally refers to any medium facilitating communication or data transfer. Examples of networks include—without limitation—an intranet, a wide area network (WAN), a local area network (LAN), a personal area network (PAN), the Internet, power line communications (PLC), a cellular network (e.g., GSM network), or the like. Furthermore, network 220 may facilitate any type of communication or data transfer via wireless or wired connections. In addition to facilitating communication between computing device 230 and power-management mechanism 210, network 220 may also facilitate peer-to-peer communication between computing device 230 and additional computing devices.

Figure 3:
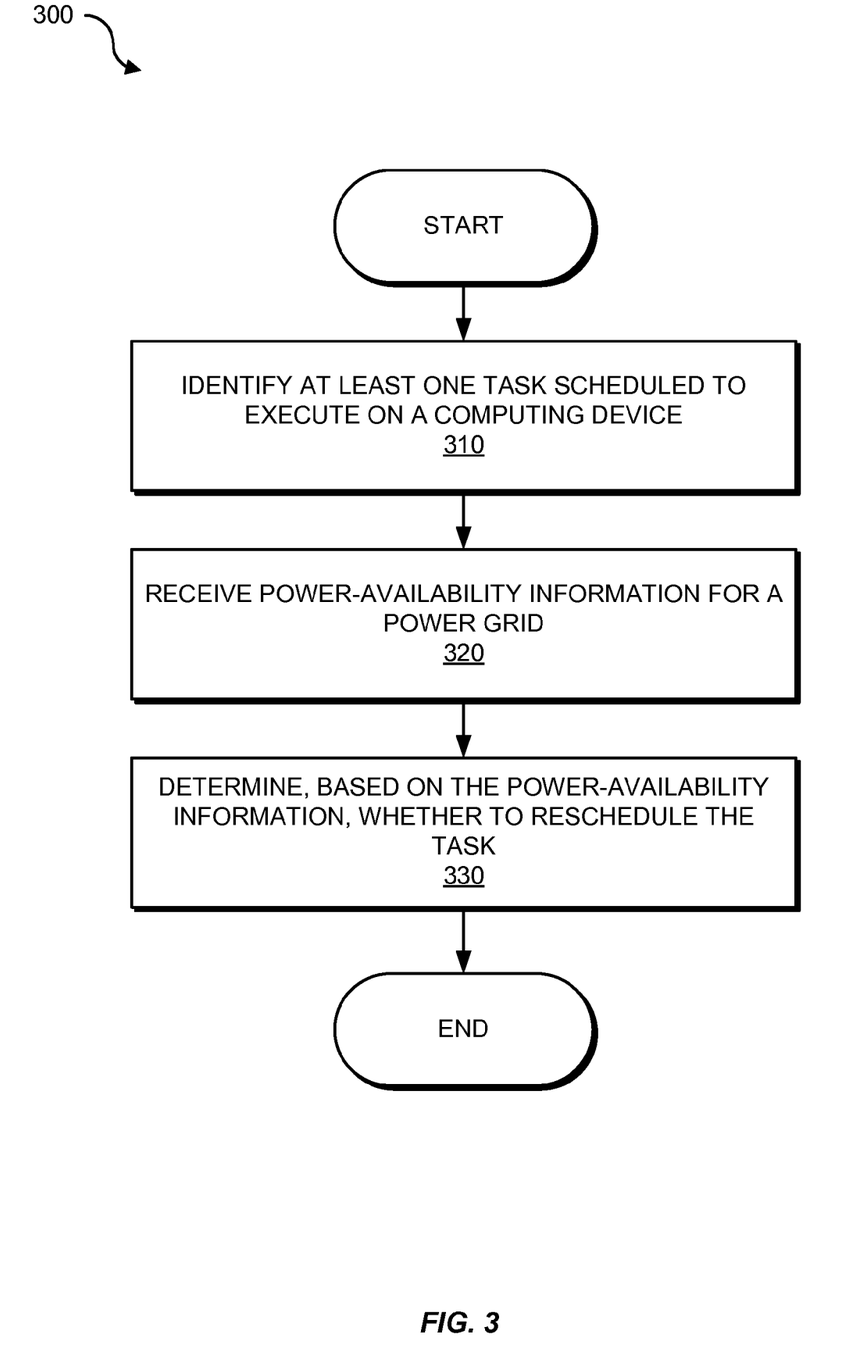
FIG. 3 is a flow diagram of an exemplary computer-implemented method for determining whether to reschedule tasks on computing devices based on power-availability information for a power grid according to at least one embodiment.

FIG. 3 is a flow diagram of an exemplary method 300 for determining whether to reschedule tasks on computing devices based on power-availability information for a power grid. As illustrated in step 310 of this figure, at least one task scheduled to execute on a computing device may be identified. For example, task-scheduling module 108 in FIG. 1, which may be stored and configured to run on computing device 230 in FIG. 2, may identify at least one task scheduled to execute on computing device 230. Examples of such tasks may include—without limitation—malware scans, virus scans, spyware scans, software or operating system updates, defragmentation tasks, automated system repairs, video or audio rendering/encoding/decoding/transcoding tasks, optical-disc-creation tasks, raid-array rebuilding or repair tasks, or any other task.

At step 320, power-availability information for the power grid may be received from a power-management mechanism. For example, power-availability module 106, which may be stored and configured to run on computing device 230, may receive power-availability information from power-management mechanism 210 via network 220. The phrase "power-availability information," as used herein, generally refers to any information that may indicate, or may be used to calculate, the amount of power available on a power grid at a moment in time. In certain embodiments, the power-availability information may identify an amount of power currently available on the power grid and/or an amount of power expected to be available on the power grid at a future time. The power-availability information may be represented in either computer-readable or human-readable format.

In additional embodiments, the power-availability information may comprise power-capacity information for the power grid and/or power-usage information for the power grid. The power-capacity information may indicate the maximum amount of power that the power grid is capable of sourcing—more specifically, the maximum amount of power that a power source within the power grid is capable of sourcing. In contrast, the power-usage information may indicate the collective amount of power used or consumed by electrical devices on the power grid (i.e., devices powered by the power grid). Such electrical devices may also comprise non-computing devices (i.e., devices without a CPU), such as blow dryers or light bulbs. In this embodiment, power-availability module 106 may calculate an amount of power currently available on the power grid by subtracting the total power usage on the power grid from the total power capacity of the power grid.

As detailed above, the power-availability information may identify the amount of power currently available on the power grid or the amount of power expected to be available on the power grid at a future time. The system may forecast or project future power availability in several ways. For example, power-management mechanism 210 may forecast future power availability using statistical data analysis based on previous data (e.g., data trends). In certain embodiments, power-management mechanism 210 may gather information needed to forecast power availability for the power grid by interacting with task-scheduling module 108 and power-estimation module 110 on a number of computing devices within the grid.

At step 330, the system may determine whether to reschedule the task on the computing device based on the power-availability information received in step 320. For example, task-scheduling module 108, which may be stored and configured to run on computing device 230, may determine, by analyzing the power-availability information received in step 320, that there is sufficient power available to execute the task as currently scheduled. Thus, in this example, task-scheduling module 108 may allow the task to execute on computing device 230 at its scheduled time.

In an additional embodiment, the power-availability information received in step 320 may indicate that the power availability for the power grid is low (i.e., below a certain threshold) or that demand is high. In these situations, task-scheduling module 108 may postpone or reschedule the task based on the power-availability information.

In additional embodiments, however, task-scheduling 108 may allow a task to execute on computing system 230 even if the power-availability information received in step 320 indicates that the power availability for the power grid is low or that demand is high. For example, task-scheduling module 108 may determine that the task scheduled to execute on computing device 230 is critical and therefore must be executed at its scheduled time despite a low level of power availability for the power grid—as indicated by the power-availability information. Upon completing step 330, exemplary method 300 may terminate.

Although not illustrated in FIG. 3, in at least one embodiment exemplary method 300 may comprise further steps. For example, power-estimation module 110 in FIG. 1, which may be stored and configured to run on computing device 230, may identify at least one characteristic of the task scheduled to execute on computing device 230. Such characteristics may include—without limitation—when the task is expected to execute, the expected duration of the task, the expected power usage of the computing device during the task, the level of urgency for the task, or any other characteristic of the task.

In certain embodiments, task-scheduling module 108 may take one or more characteristics of the task into account when determining whether to reschedule the task. For example, task-scheduling module 108 may determine whether the expected power usage of a task is low enough to allow the task to execute at its scheduled time despite lower power availability on the power grid.

In an additional embodiment, power-estimation module 116 may transmit one or more characteristics of the task to power-management mechanism 210 via network 220. Power-management mechanism 210 may then consider one or more characteristics of the task when determining whether to reschedule the task or estimating future power availability for the power grid. For example, power-management mechanism 210 may use expected duration and expected power-usage information for tasks from a number of computing devices to forecast the amount of power expected to be available on the power grid at a future time. As such, in certain embodiments the power-availability information received in step 320 may be based, at least in part, on one or more characteristics of the task.

Power-estimation module 110 may identify characteristics of a task, such as expected power usage of computing device 230 during execution of a task, in a variety of ways. For example, power-estimation module 110 may retrieve and analyze CPU-, disk-, and/or memory-usage information stored as metadata with a task. This information may be represented in a variety of ways, including using a scale of 1 to 100, where 1 is "very light" and 100 is "very heavy."

After analyzing the usage information for the task, power-estimation module 110 may then estimate expected power usage of the computing device during the task based on known idle power usage and known load power usage (i.e., power usage while the computing device is idle and power usage while the computing device is under load). For example, power-estimation module 110 may estimate that an anti-virus scan that requires an average of 50% of the resources of computing device 230 will require an extra 35 W if the idle power usage of computing device 230 is 115 W and the load power usage of computing device 230 is 185 W ((185 W-115 W)*50%).

In an alternative example, power-estimation module 110 may measure actual power usage of computing device 230 while idle and during the task, and maintain a running average used to estimate future power usage. In some embodiments, power-estimation module 110 may create a power-usage delta indicating the difference between the power usage while idle and the power usage during the task. Although the task executes on computing device 230, power-estimation module 110 may be stored and configured to run on computing device 230 and/or power-management module 210, and may estimate power usage for computing device 230 on either or both.

Figure 4:
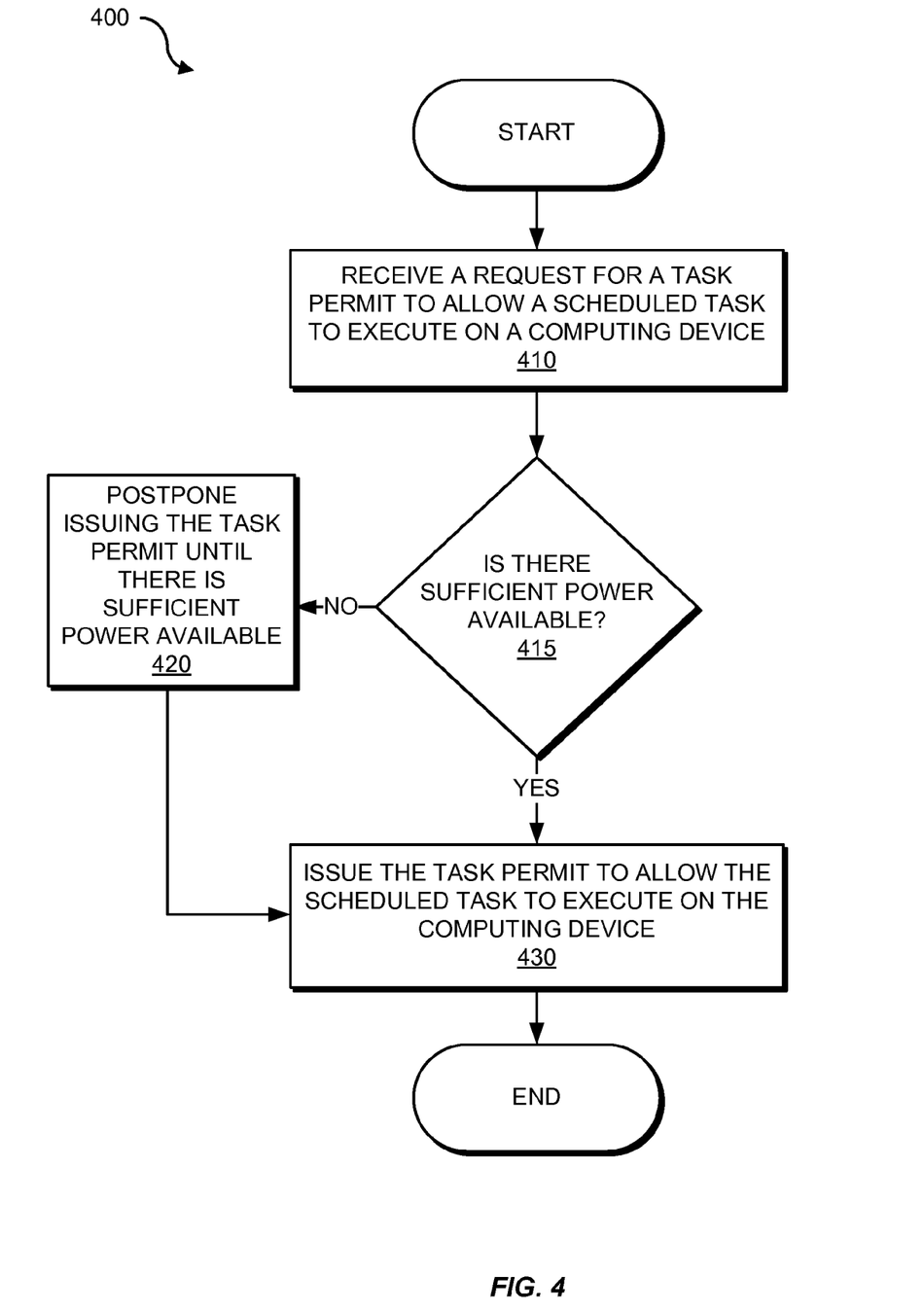
FIG. 4 is a flow diagram of an exemplary computer-implemented method for issuing task permits to allow tasks to execute on computing devices according to at least one embodiment.

As detailed above, the systems and methods described herein may also comprise a task-permit module for issuing task permits to computing devices that allow specific tasks to run. FIG. 4 is a flow diagram of an exemplary method 400 for requesting task permits to allow tasks to execute on computing devices. In certain embodiments, exemplary method 400 may be performed in conjunction with exemplary method 300 described above.

As illustrated in this figure, at step 410 a request for a task permit may be transmitted to the power-management mechanism. For example, task-permit module 112 in FIG. 1, which may be stored and configured to run on computing device 230, may transmit a request for a task permit to allow a task to execute on computing device 230 to power-management mechanism 210 via network 220.

At step 415, the system may determine whether there is sufficient power available to execute the task on the computing device. For example, power-availability module 106, which may be stored and configured to run on power-management mechanism 210, may determine—by considering at least one characteristic of the task in view of the power availability—that there is sufficient power available on the power grid to execute the task on computing device 230. In this example, after power-availability module 106 determines that there is sufficient power available, exemplary method 400 may continue directly to step 430, thus bypassing step 420.

In an alternative example, power-availability module 106 may determine—by considering at least one characteristic of the task in view of the power availability—that there is not sufficient power available on the power grid or that the current or future load on the power grid is too high to execute the task on computing device 230. In this situation, additional steps—such as step 420—may be taken in order to reduce power usage on the power grid.

At step 420, after determining that there is not sufficient power available to execute the task, the task permit may be postponed. For example, task-permit module 112, which may be stored and configured to run on power-management mechanism 210, may postpone issuing the task permit in view of the power availability for the power grid. The task permit may remain postponed until there is sufficient power available on the power grid, as determined by power-availability module 106. Depending on the configuration of power-availability module 106, the definition of sufficiency may vary with regard to power availability. In this example, after power-availability module 106 determines that there is sufficient power available, exemplary method 400 may continue to step 430.

At step 430, a task permit may be issued to the computing device as requested in step 410. For example, task-permit module 112 may cause power-management mechanism 210 to issue a task permit to allow the task to execute on computing device 230. Computing device 230 may then execute the task upon receiving the task permit. Upon completing step 430, exemplary method 400 may terminate.

In certain embodiments, task-permit module 112 may issue tasks that identify a preferred time for executing a task. In additional embodiments, task-permit module 112 may issue tasks that simply grant computing device 230 the ability to execute a task at will. In either example, computing device 230 may execute the task in accordance with the task permit or in a manner that is not in accordance with the task permit. For example, task-scheduling module 108 may determine, upon receiving a task permit that identifies a preferred time for executing a task, to allow the task to execute at either the preferred time or at an undesirable time. In certain embodiments, if task-scheduling module 108 executes the task in accordance with the task permit, then computing device 230 may receive a power-usage discount.

As detailed above, the systems and methods disclosed herein may allow a power-management mechanism to induce computing devices to reschedule tasks based on power-availability information for a power grid. This process may reduce the number of power outages, both intentional (e.g., rolling blackouts) and unintentional, resulting from insufficient infrastructure or resources.

Figure 5:
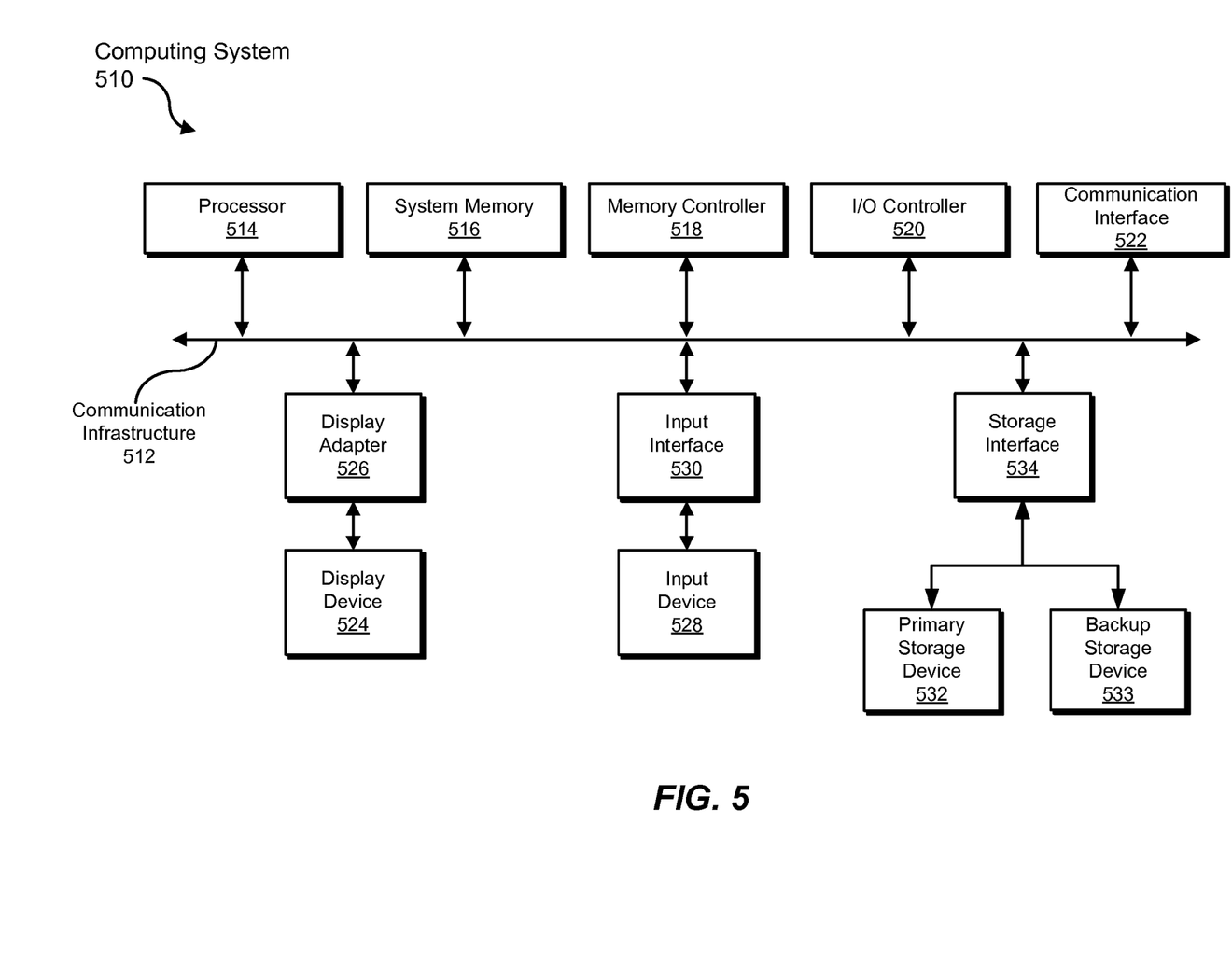
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the publishing, receiving, identifying, determining, estimating, issuing, calculating, rescheduling, and transmitting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as publishing, receiving, identifying, determining, estimating, issuing, calculating, rescheduling, and/or transmitting.

I/O controller 520 generally represents any type or form of module capable of coordinating and/or controlling the input and output functions of a computing device. For example, in certain embodiments I/O controller may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the publishing, receiving, identifying, determining, estimating, issuing, calculating, rescheduling, and transmitting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the publishing, receiving, identifying, determining, estimating, issuing, calculating, rescheduling, and transmitting steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the publishing, receiving, identifying, determining, estimating, issuing, calculating, rescheduling, and transmitting steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the publishing, receiving, identifying, determining, estimating, issuing, calculating, rescheduling, and transmitting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
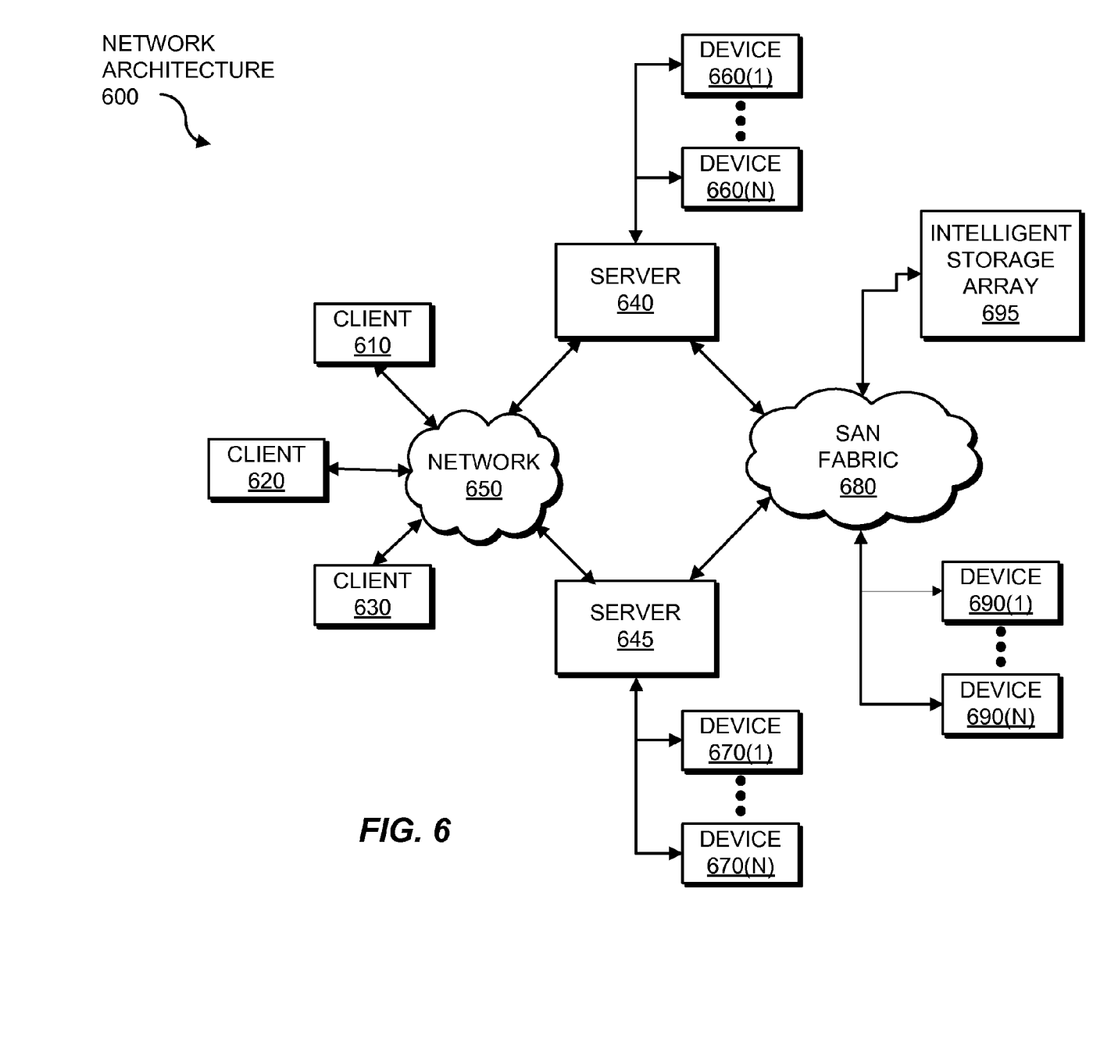
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), the Internet, a cellular network (e.g., GSM network), or any other network.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the publishing, receiving, identifying, determining, estimating, issuing, calculating, rescheduling, and transmitting steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, a system for determining whether to reschedule tasks on computing devices based on power-availability information for a power grid may comprise: 1) a power-availability module for publishing power-availability information for the power grid, and 2) a task-scheduling module for receiving the power-availability information from the power-availability module, identifying at least one task scheduled to execute on a computing device, and then determining, based on the power-availability information, whether to reschedule the task.

In certain embodiments, the system may further comprise a power-estimation module for estimating both the expected duration of the task and the expected power usage of the computing device during the task. In addition, the system may also comprise a task-permit module for receiving requests for a task permit, issuing the task permit to allow the task to execute on the computing device, and issuing a discount to the computing device for executing the task in accordance with the task permit.

A computer-implemented method for determining whether to reschedule tasks on computing devices based on power-availability information for a power grid may comprise: 1) identifying at least one task scheduled to execute on a computing device, 2) receiving power-availability information for the power grid, and then 3) determining, based on the power-availability information, whether to reschedule the task. In some embodiments, the computing device may reschedule the task based on the power-availability information.

The power-availability information may comprise power-capacity information and power-usage information for the power grid, which may indicate power capacity and power usage for the power grid, respectively. In at least one embodiment, the computing device may calculate power availability for the power grid based on the power-capacity information and the power-usage information. Although, in other embodiments, the power-availability information may identify the power availability for the power grid without requiring the computing device to calculate the power-availability information. Moreover, the power-availability information may identify either an amount of power currently available on the power or an amount of power expected to be on the power grid at a future. The power-availability information may comprise computer-readable information and/or human-readable information.

In addition, the method may also comprise identifying at least one characteristic of the task scheduled to execute on the computing device. The characteristic may indicate: 1) when the task is expected to execute, 2) the expected duration of the task, 3) the expected power usage of the computing device during the task, and/or 4) the level of urgency for the task. In at least one embodiment, the method may further comprise transmitting the characteristic of the task to a power-management mechanism. The characteristic may help forecast or project future power availability for the power grid.

In another embodiment, the method may comprise transmitting—to the power-management mechanism—a request for a task permit to allow the task to execute on the computing device. After transmitting the request, the method may comprise receiving—from the power-management mechanism—the task permit, thereby allowing the task to execute on the computing device. The power-management mechanism may also postpone issuing the task permit to prevent the task from executing on the computing device. Until receiving the task permit, the computing device may be unable to execute the task.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A system for determining whether to reschedule tasks on a plurality of computing devices based on needs of a power grid, the system comprising:
  a task-scheduling module and a power-estimation module programmed to:
    receive power-availability information for the power grid from a power utility that supplies power via the power grid, wherein the power-availability information identifies a low level of power availability on the power grid;
    identify a plurality of instances of a scan for malicious software that are scheduled to simultaneously execute on the plurality of computing devices at a scheduled time;
    calculate a power-usage delta for the instances of the scan for malicious software that identifies an estimated amount of power required to simultaneously execute the instances of the scan for malicious software on the plurality of computing devices by measuring an amount of power that is expected to be consumed by the plurality of computing devices when simultaneously executing the instances of the scan, wherein measuring the amount of power that is expected to be consumed by the plurality of computing devices when simultaneously executing the instances of the scan comprises:
      measuring an amount of power consumed by the plurality of computing devices when the plurality of computing devices are not idle;
      estimating a percentage of the plurality of computing devices' resources that the instances of the scan for malicious software will consume;
      subtracting an amount of power consumed by the plurality of computing devices when the plurality of computing devices are idle from the amount of power consumed by the plurality of computing devices when the plurality of computing devices are not idle; and
      multiplying a result of subtracting the amount of power consumed by the plurality of computing devices when the plurality of computing devices are idle from the amount of power consumed by the plurality of computing devices when the plurality of computing devices are not idle by the estimated percentage;
    determine, by analyzing both the power-availability information and the estimated amount of power required to simultaneously execute the instances of the scan for malicious software on the plurality of computing devices, whether the estimated amount of power required to simultaneously execute the instances of the scan for malicious software on the plurality of computing devices is low enough to allow the instances of the scan for malicious software to simultaneously execute on the plurality of computing devices at the scheduled time despite the low level of power availability on the power grid; and determine, based on the determination of whether the estimated amount of power required to simultaneously execute the instances of the scan for malicious software on the plurality of computing devices is low enough to allow the instances of the scan for malicious software to simultaneously execute on the plurality of computing devices at the scheduled time despite the low level of power availability on the power grid, whether to reschedule the instances of the scan for malicious software to a different time; and at least one processor configured to execute the task-scheduling module and the power-estimation module.

2. The system of claim 1, wherein:
the task-scheduling module and the power-estimation module are further programmed to identify one or more characteristics of at least one scan from within the plurality of instances of the scan by retrieving at least one of central processing unit usage, disk-usage, and memory-usage information stored as metadata with the at least one scan.

3. A computer-implemented method for determining whether to reschedule tasks on a plurality of computing devices based on needs of a power grid, the method comprising:

receiving power-availability information for the power grid from a power utility that supplies power via the power grid, wherein the power-availability information identifies a low level of power availability on the power grid;

identifying a plurality of instances of a scan for malicious software that are scheduled to simultaneously execute on the plurality of computing devices at a scheduled time;

calculating a power-usage delta for the instances of the scan for malicious software that identifies an estimated amount of power required to simultaneously execute the instances of the scan for malicious software on the plurality of computing devices by measuring an amount of power that is expected to be consumed by the plurality of computing devices when simultaneously executing the instances of the scan, wherein measuring the amount of power that is expected to be consumed by the plurality of computing devices when simultaneously executing the instances of the scan comprises:

measuring an amount of power consumed by the plurality of computing devices when the plurality of computing devices are not idle;

estimating a percentage of the plurality of computing devices' resources that the instances of the scan for malicious software will consume;

subtracting an amount of power consumed by the plurality of computing devices when the plurality of computing devices are idle from the amount of power consumed by the plurality of computing devices when the plurality of computing devices are not idle; and multiplying a result of subtracting the amount of power consumed by the plurality of computing devices when the plurality of computing devices are idle from the amount of power consumed by the plurality of computing devices when the plurality of computing devices are not idle by the estimated percentage;

determining, by analyzing both the power-availability information and the estimated amount of power required to simultaneously execute the instances of the scan for malicious software on the plurality of computing devices, whether the estimated amount of power required to simultaneously execute the instances of the scan for malicious software on the plurality of computing devices is low enough to allow the instances of the scan for malicious software to simultaneously execute on the plurality of computing devices at the scheduled time despite the low level of power availability on the power grid; and determining, based on the determination of whether the estimated amount of power required to simultaneously execute the instances of the scan for malicious software on the plurality of computing devices is low enough to allow the instances of the scan for malicious software to simultaneously execute on the plurality of computing devices at the scheduled time despite the low level of power availability on the power grid, whether to reschedule the instances of the scan for malicious software to a different time;

wherein the method is performed by at least one hardware processor.

4. The method of claim 3, wherein the power-availability information comprises at least one of:
power-capacity information for the power grid; and
power-usage information for the power grid.

5. The method of claim 4, further comprising calculating, based on the power-capacity information and the power-usage information, an amount of power available on the power grid.

6. The method of claim 3, wherein the power-availability information identifies at least one of:
an amount of power currently available on the power grid; and
an amount of power expected to be available on the power grid at a future time.

7. The method of claim 3, wherein the power-availability information comprises at least one of:
computer-readable information; and
human-readable information.

8. The method of claim 3, further comprising:
identifying at least one characteristic of at least one scan from within the plurality of instances of the scan; and
transmitting the at least one characteristic of the at least one scan to a power-management mechanism.

9. The method of claim 8, wherein the at least one characteristic of the at least one scan comprises at least one of:
when the at least one scan is expected to execute on at least one of the plurality of computing devices;
an expected duration of the at least one scan;
the estimated amount of power required to execute the at least one scan on at least one of the plurality of computing devices; and
a level of urgency for the at least one scan.

10. The method of claim 8, further comprising transmitting, to the power-management mechanism, a request for a task permit to allow the instances of the scan for malicious software to execute on the plurality of computing devices.

11. The method of claim 10, further comprising receiving the task permit from the power-management mechanism.

12. The method of claim 11, wherein the task permit specifies a preferred time for executing the instances of the scan for malicious software.

13. The method of claim 11, further comprising, in response to receiving the task permit from the power-management mechanism:
executing the instances of the scan for malicious software in accordance with the task permit; or
executing the instances of the scan for malicious software in a manner that is not in accordance with the task permit.

14. The method of claim 13, further comprising receiving a power-usage discount for executing the instances of the scan for malicious software in accordance with the task permit.

15. The method of claim 3, wherein the power grid comprises at least one of:
- a power plant;
- an electrical generator; and
- a solar panel.

16. The method of claim 3, wherein receiving the power-availability information comprises forecasting the power-availability information based on data trends.

17. The method of claim 3, further comprising:
- identifying one or more characteristics of at least one scan from within the plurality of instances of the scan by retrieving at least one of central processing unit usage, disk-usage, and memory-usage information stored as metadata with the at least one scan.

18. A non-transitory computer-readable medium comprising one or more computer-executable instructions that, when executed by a hardware device that comprises at least one processor, cause the hardware device to:
- receive power-availability information for a power grid from a power utility that supplies power via the power grid, wherein the power-availability information identifies a low level of power availability on the power grid;
- identify a plurality of instances of a scan for malicious software that are scheduled to simultaneously execute on a plurality of computing devices at a scheduled time;
- calculate a power-usage delta for the instances of the scan for malicious software that identifies an estimated amount of power required to simultaneously execute the instances of the scan for malicious software on the plurality of computing devices by measuring an amount of power that is expected to be consumed by the plurality of computing devices when simultaneously executing the instances of the scan, wherein measuring the amount of power that is expected to be consumed by the plurality of computing devices when simultaneously executing the instances of the scan comprises:
  - measuring an amount of power consumed by the plurality of computing devices when the plurality of computing devices are not idle;
  - estimating a percentage of the plurality of computing devices' resources that the instances of the scan for malicious software will consume;
  - subtracting an amount of power consumed by the plurality of computing devices when the plurality of computing devices are idle from the amount of power consumed by the plurality of computing devices when the plurality of computing devices are not idle; and
  - multiplying a result of subtracting the amount of power consumed by the plurality of computing devices when the plurality of computing devices are idle from the amount of power consumed by the plurality of computing devices when the plurality of computing devices are not idle by the estimated percentage;
- determine by analyzing both the power-availability information and the estimated amount of power required to simultaneously execute the instances of the scan for malicious software on the plurality of computing devices, whether the estimated amount of power required to simultaneously execute the instances of the scan for malicious software on the plurality of computing devices is low enough to allow the instances of the scan for malicious software to simultaneously execute on the plurality of computing devices at the scheduled time despite the low level of power availability on the power grid; and
- determine, based on the determination of whether the estimated amount of power required to simultaneously execute the instances of the scan for malicious software on the plurality of computing devices is low enough to allow the instances of the scan for malicious software to simultaneously execute on the plurality of computing devices at the scheduled time despite the low level of power availability on the power grid, whether to reschedule the instances of the scan for malicious software to a different time.

* * * * *